Sept. 9, 1941.  G. E. KING  2,255,064
VARIABLE VOLTAGE MOTOR CONTROL
Filed Nov. 29, 1939  2 Sheets—Sheet 1

WITNESSES:
Leon M. Garman

INVENTOR
George E. King.
BY
Paul C. Friedemann
ATTORNEY

Patented Sept. 9, 1941

2,255,064

UNITED STATES PATENT OFFICE 2,255,064

VARIABLE VOLTAGE MOTOR CONTROL

George E. King, Wilkinsburg, Pa., assignor to Westinghouse Electric & Manufacturing Company, East Pittsburgh, Pa., a corporation of Pennsylvania Application November 29, 1939, Serial No. 306,667

20 Claims. (Cl. 172—239)

My invention relates to electric motor control systems, and more particularly to control systems for automatically controlling the operation of motors used to drive reciprocating mechanisms, such as planers, draw-cut shapers, roll grinders, transfer tables, etc., by a variable voltage control.

My invention embodies improvements over the subject matter disclosed and claimed in my application filed jointly with William R. Harding and William F. Eames on March 30, 1938, Serial No. 198,884, and entitled Variable voltage control systems, and also improvements over my prior application filed March 30, 1938, Serial No. 198,883, and entitled Control systems, and my prior application filed June 16, 1938, Serial No. 214,032, and entitled Variable voltage motor controls.

In a conventional variable-voltage control, the motor is ordinarily provided with a separately excited field winding and the desired direction of rotation of the motor is effected by reversing the polarity of the energy supplied to the motor armature. The motor is arranged to be energized from a generator which may be provided with a series field winding to compensate for the IR drop in: the generator armature circuit; the armature circuit of the motor; the series field winding itself; and the leads interconnecting the generator and motor armatures. The generator is provided with a separately excited main field winding, the current through which is arranged to be controlled and reversed in order to operate the motor and the load attached thereto, for example, a planer platen, at various speeds in either direction of travel. The excitation of the main field winding of the generator may be controlled by means of a rheostat or the combination of various resistors and suitable control devices for inserting various steps of resistance in circuit with the main field winding.

For each position of the controller controlling the field current in the generator, there is a particular speed of operation of the motor and thus the load, as a planer platen, that is desired. Any departure in speed from the desired value introduces undesirable operations of the load. If it were possible to maintain all of the conditions affecting such a control constant the desired operation could be secured with the simple conventional variable-voltage control just briefly explained.

Since it is manifestly impossible to maintain all the conditions affecting a variable-voltage control constant, I use, with such a control, a regulator-generator having a series field winding arranged to be responsive to the current supplied to the motor, and a main, or shunt field winding arranged to be responsive to the voltage applied to the motor. These field windings are differentially related to each other and are so disposed with reference to each other that the regulator-generator, in operation, generates a voltage which is a function of the speed of, and the load carried by, the motor. Differential field windings are also provided on the regulator-generator and are connected, respectively, in series circuit relation with the main field windings of the generator of the control system for opposing the combined action of the series and shunt field windings. The armature of the regulator-generator is arranged to be connected in series circuit relation with these regulator-generator differential field windings and the field windings of the generator of the control system and to the controller, which may be operated to independently vary the flow of current through the main generator field windings.

By a proper selection of the electrical characteristics and constants of the electrical units included with my system of control, and by a selection of a particular interconnection of the electrical units and by making some minor compromises the proper functioning can be secured, that is, the motor speed can be made to be proportional to the setting of controller regardless of: changes in ambient temperature; variations in the load on the motor; direction of operation of the motor; rapidity of the voltage reversal on the motor terminals; and regardless of the many other factors that would ordinarily prevent the desired operation of the motor.

Further, I have discovered that by a proper selection of the constants of the electrical units of a Wheatstone bridge, including the main field windings of the main generator, the differential field windings of the regulator-generator, the armature of the regulator-generator and resistors, that the control effect of the regulator can be made much faster and can be made substantially independent of the shape and slope of the curve indicating its saturation characteristics. Still other advantages may be obtained, which advantages will become more apparent from a study of the objects of my invention hereinafter stated and from the claims hereto appended.

A broad object of my invention is to provide a system of control for varying the voltage impressed on the terminals of a direct current motor in such manner that the speed selected for the motor by the control is attained in a relatively short time interval and is substantially independent of: the load on the motor; the direction of rotation of the motor; and any of the other factors that would ordinarily prevent operation of the motor at the speed selected for it.

Another object of my invention is to automatically increase the speed of reversal of a reversible motor and to effect such rapid reversal of a motor in a substantially constant selected time interval dependent upon the motor speed selected but substantially independent of any variations in load and variations in speed from the selected speed that tend to occur.

It is also an object to improve commutation, both for long stroke and short stroke operation of a reciprocating member, of a generator and the motor connected to it and operating a reciprocating member.

One object of my invention is to shorten the useless portion of the stroke of a reciprocating device through a scheme of control affecting or modifying the variable voltage control such as I disclose and claim in the last patent application of mine above recited.

Another object of my invention is to make the speed regulation in a variable voltage system substantially independent of the length of the stroke of a reciprocating member operated by a motor subject to variable voltage control.

It is also an object of my invention to eliminate the defects, pointed out more in detail hereinafter, of the prior devices.

Other objects and advantages will become more apparent from a study of the following specification and the drawings accompanying the specification, in which.

The circuit arrangements shown in the applications above noted show schemes of control using a bridge type speed regulator-generator as used on planers and similar machine tool drives.

The regulator-generator provides very close speed regulation over a wide speed range. The regulator-generator does not force the acceleration or retardation of the main motor. The rate of acceleration and retardation of the main motor is dependent on the time constant of the variable voltage generator shunt fields. This has been determined experimentally and is evident from an analysis of the circuit. As the current changes in the variable voltage generator shunt fields and the variable voltage generator terminal voltage changes accordingly, the regulator-generator field circuits remain nearly balanced. The regulator-generator armature voltage therefore remains approximately zero. The only time the regulator generator armature generates a voltage is when there is an unbalanced condition existing in its field circuits.

Referring to the drawings, it will be noted that the regulator-generator armature circuit between junctions B and D (see Fig. 4) in conjunction with the bridge resistors R₁ and R₄ acts as a discharge resistor around the variable voltage generator shunt fields 5 and 6 and consequently slows down the rate of change of the current both in the building up and dying down.

Figure 1:
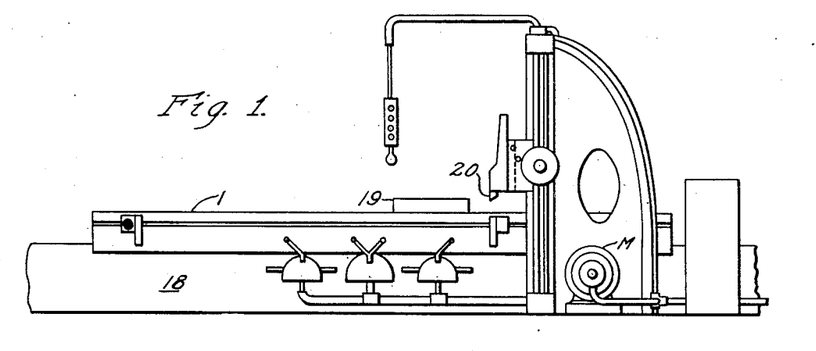
Figure 1 is a side view, somewhat diagrammatic, of a planer having a tool support and a motor for operating a planer platen.
Figures 2, 3, 4:
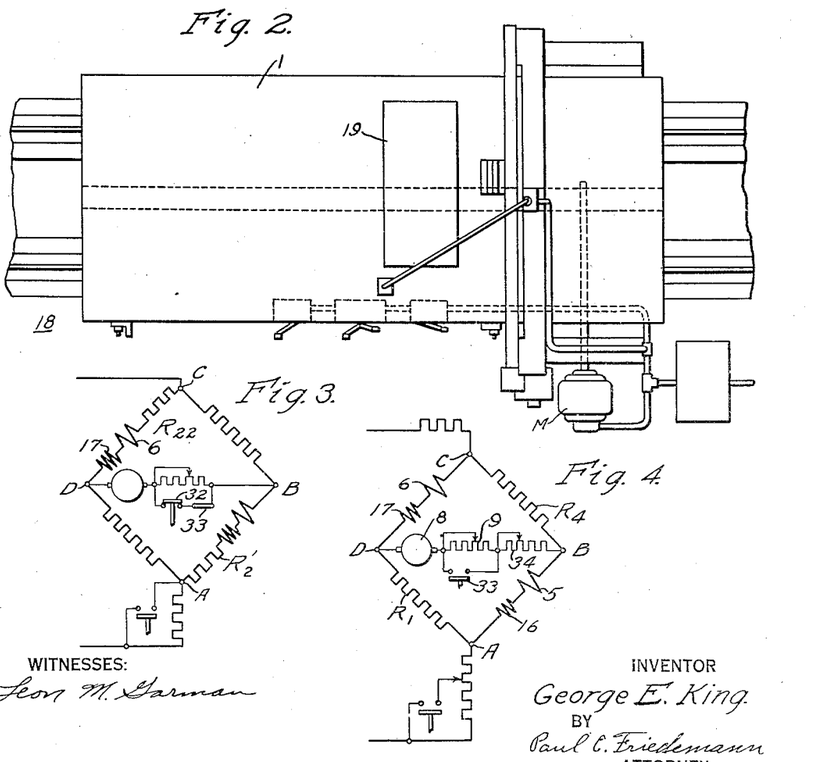
Fig. 2 is a plan view of the subject matter shown in Fig. 1.
Figs. 3 and 4 are diagrams which together show that portion of my system of control embodying some of the novel features of my invention.
Figure 5:
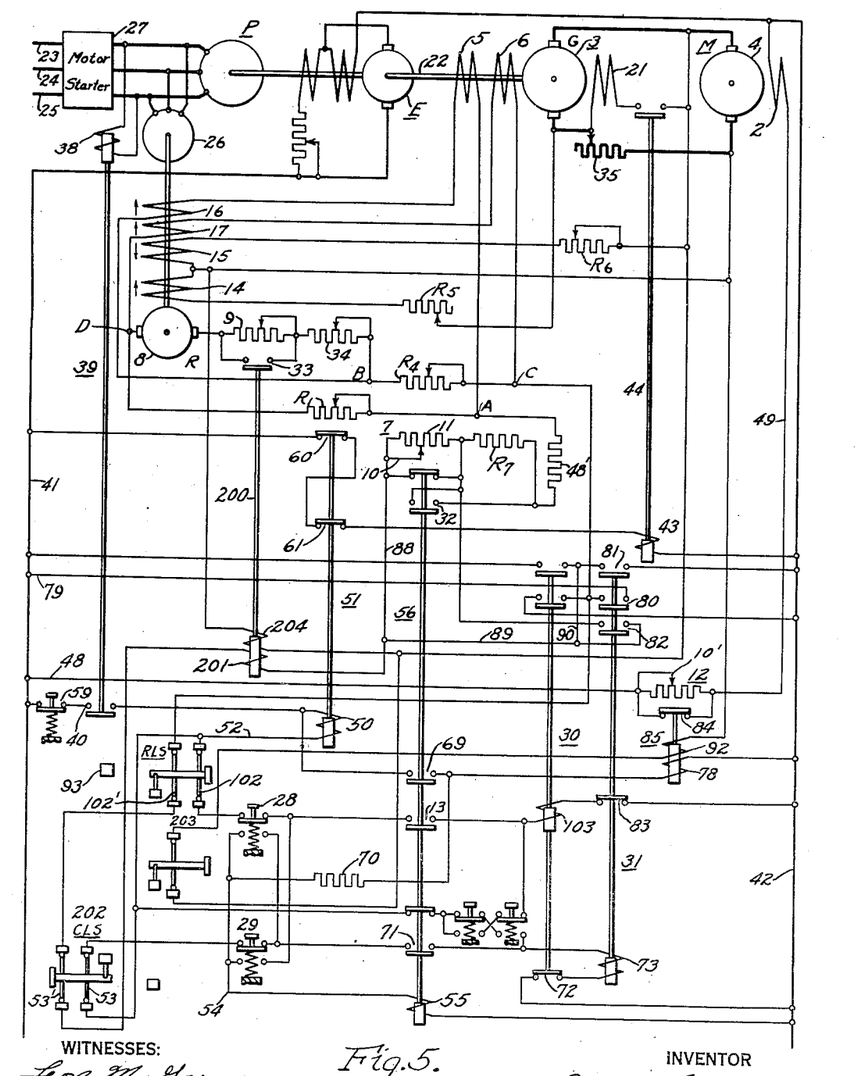
Fig. 5 is a diagrammatic showing of a variable voltage control including the novel features of my invention.

This action occurs at the end and the beginning of the cycle of operation when the regulator generator armature voltage is approximately zero. All of the retardation and the initial part of the acceleration occurs at the end of the stroke after the reversing limit switches are operated. This is usually considered as the useless part of the stroke as the limit switches are operated at the point where the cutting tool leaves the work.

When operating on short strokes the motor is alternately accelerating and retarding, and never reaches a constant speed. The regulator generator cannot do any good under these conditions and, in fact, causes slowing down of the operation. To improve the short stroke operation a resistor 9 was added in series with the regulator-generator armature to increase the effective discharge resistance around the variable voltage generator shunt fields. The ohmic value of the resistor 9 determines the number of short strokes that can be made in a given time. A resistor is chosen to limit the maximum number of strokes. The maximum number of strokes must be limited due to heating in the variable voltage generator and main motor because of the reversing current peaks. A manual switch corresponding to switch 33, was heretofore added to short circuit the resistor 9 for long stroke operation where good speed regulation is required.

While this scheme worked satisfactorily, it required attention on the part of the operator and had certain disadvantages. If the manual switch was left open on long strokes poor commutation as well as poor regulation resulted. Poor commutation resulted because the motor accelerated to a higher speed, and the variable voltage generator terminal voltage was higher on long strokes than on short strokes. If the planer was operating on short strokes in a pocket and the short stroke switch was closed inadvertently the stroke would lengthen and damage the tool or work. Since the manual switch must be closed on long strokes to secure good regulation and commutation the benefits of fast stopping and acceleration were lost. This meant the table drifted farther at the end of the stroke after striking the limit switch and a larger percentage of the stroke was useless requiring more time to complete a given operation. The term short stroke is rather indefinite and hard to define. The gear ratios on planers vary from four motor revolutions for one foot of table travel to fifteen motor revolutions for one foot of table travel. This made it difficult to issue any general instructions as to the maximum length stroke it was safe to use with the short stroke resistor in the circuit. The limit could be expressed only in motor revolutions since bad commutation resulted if a definite motor speed and terminal voltage were exceeded.

To avoid the above disadvantages I have developed the scheme of control disclosed and claimed in this application and in which I use a relay in place of the manual switch for shorting the resistor 9 in series with the regulator-generator armature. The operation of the relay is full automatic and requires no attention on the part of the operator. The use of the relay eliminates all the disadvantages of the manual switch for short stroke operation and improves the long stroke operation.

A still better understanding of the novel features of my invention may be had from a study of a detailed discussion of the circuit arrangement and the novel function of my system of control.

In the practice of my invention, I provide a variable-voltage control in which the motor M is mechanically coupled to drive a machine tool as a planer platen 1. The motor M is provided with a separately excited field winding 2 which is arranged to be energized in a single direction only through rheostat 12. A generator G is provided having its armature 3 substantially directly electrically connected to the armature 4 of the motor. The control of the speed and acceleration of the motor and in consequence the speed and acceleration of the planer platen and the direction of movement of the planer platen is effected by varying the amount and direction of excitation of the field windings 5 and 6 of the main generator. This control may be effected in a few or in many steps depending upon the type of operation that is desired.

In order to maintain the speed of the motor M at various constant speed values corresponding to a specific adjustment of the controller 7 used for controlling the current flowing through the main field windings of the generator, I use a regulator-generator R. This regulator-generator R is arranged to measure the speed and load of the motor and the current flowing through the main field windings 5 and 6 of the generator. The armature 8 of the regulator-generator is arranged so that it may be connected in series circuit relation with a permanent resistor 48' and with the generator field windings 5 and 6, whereby the voltage generated in the armature in response to the speed and load of the motor and the current flowing through the generator field windings 5 and 6 will cause a current to flow through the main generator field windings 5 and 6, which current will be a function of the departure of the motor speed from a predetermined value, corresponding to the particular setting of the controller 7 for the main field windings; that is, will correspond to the particular setting of the adjustable lead 10 of the rheostat 11.

Under certain load and operating conditions, no voltage will be generated in the armature of the regulator-generator R, since under these conditions the speed of the motor M corresponds to the setting of the controller 7, that is, corresponds to the adjustment of rheostats 11 and 12. For all other conditions, however, a voltage will be generated in the armature of the regulator-generator in such a direction and of such a value as to cause a current to flow through the main field windings 5 and 6 of the generator G to still operate the motor at the desired, or selected, speed.

In order to measure the speed of the motor M and load carried by the motor M, the regulator-generator R is provided with a series field winding 14 through which all or a portion of the current flowing from the generator G to the motor M flows. The regulator-generator is also provided with a main field winding 15 which is connected to be responsive to the voltage applied to the motor. These two field windings, namely, 14 and 15, are differentially related to each other so that the resulting flux is a function of the speed of the motor M as measured by the counter-electromotive force of the motor. That is, the magnetomotive force produced by the series field winding 14 is proportional to the IR drop of the motor armature 4, and the magnetomotive force produced by the main field winding 15 of the regulator-generator is proportional to the voltage impressed across the terminals of the armature of the motor. Thus, the resulting flux due to the differential relationship between the two field windings is a function of the counter-electromotive force of the motor. Since this flux results from the combined action of the current flowing through the motor armature and the voltage applied thereto, it is also a function of the load carried by the motor. The voltage which is generated in the armature of the regulator-generator due to this resulting flux is then a function of the speed of the motor and the load carried thereby.

It is desirable that any change in the voltage of the generator caused by the voltage generated in the regulator-generator armature and effecting the current flow through the main field windings 5 and 6 of the generator G be immediately reflected in the voltage generated in the armature 8 of the regulator-generator R. Such action is desired in order to prevent hunting of the system. As soon as a voltage appears in the armature of the regulator-generator indicating that the speed of the motor M has departed from the desired speed, a change in the flow of current through the main field windings 5 and 6 of the generator G takes place in such a direction as to tend to restore the speed of the motor to the desired speed. If some means is not provided for immediately effecting a corresponding change in the corrective voltage generated in the armature 8 of the regulator-generator R, the resulting change in the effects of the series and main field windings 14 and 15 of the regulator-generator in response to the corrective effect will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field windings 5 and 6 of the generator G, a pair of differential field windings 16 and 17 are provided in the regulator-generator. These field windings 16 and 17 are connected in series with the main generator field windings 5 and 6, respectively. Thus any change in current which flows through the main generator field windings 5 and 6 is immediately reflected in the voltage which is generated by the armature of the regulator-generator. It is then unnecessary to await the correction in the speed of the motor, as reflected in the change in the effects produced by the series and main field windings of the regulator-generator to correspondingly affect the voltage generated by the armature of the regulator-generator. The differential field windings 16 and 17 of the regulator-generator are arranged to produce an effect in the same direction as the effect produced by the series field winding 14 of the regulator-generator and, therefore, they oppose or are differentially related to the effect of the main field winding 15 of the regulator-generator.

There is always, then, a certain relationship between the speed and load of the motor and the corrective effect caused thereby in altering the flow of current through the main field windings of the generator. As a result, the system is free from hunting and the speed of the motor is maintained at predetermined values corresponding to various settings of the lead 10 of the controller 7 regardless of the many variable conditions which would otherwise affect the speed, and cause it to change from the values desired.

As has been stated hereinbefore, it is desirable to effect a corrective action in the current flowing through the main field windings 5 and 6 of the generator G by means of the regulator-generator R, without altering the currents flowing through the main field windings 5 and 6 from the controller. It is then possible to maintain a precise relationship between the speed of the motor and the corresponding movement of the planer platen and the various settings of the controller, regardless of the load or other variable conditions which otherwise would normally affect the operation of the motor.

I have discovered that a Wheatstone bridge arrangement may be combined with the control for machine tools to effect the desired independent control of the current flowing through the main field windings of the generator. I provide a Wheatstone bridge circuit in which the differential field windings 16 and 17 of the regulator-generator and the main generator field windings 5 and 6 are respectively connected in series circuit relation, and form all of two of the branches of the Wheatstone bridge circuit. The armature of the regulator-generator is connected across one pair of opposite terminals, as B and D, of the Wheatstone bridge circuit while the remaining pair of terminals, as A and C, is connected through some switches and through the controller 7 to an independent source of electrical energy. With such an arrangement, it is possible to vary the current flowing through the branches of the bridge containing the main field windings 5 and 6 of the generator G by means of the controller 7 independently of the current flow therethrough from the armature of the regulator-generator, and vice versa.

Referring more particularly to the drawings, the reference character M designates generally the motor mechanically coupled to drive the planer platen 1 of the planer 18. A workpiece 19 is shown mounted on the platen, and as the platen reciprocates, by reason of the reversing operation of the motor M, the tool 20 mounted on the cross rail operates on the workpiece 19.

The motor M is substantially directly electrically connected to the generator G. The generator G has main field windings 5 and 6 and a differential stabilizing field winding 21. The armature 3 of the generator G is mechanically coupled to the shaft 22 of the induction motor, or other prime mover P. This induction motor P is disposed to be connected to the buses 23, 24 and 25 leading to a suitable source of alternating current energy.

In order to properly control the motor M, I use a regulator-generator generally designated R, which regulator-generator has the armature 8 mechanically coupled to an induction motor 26. The motor 26 is a relatively small machine, but has winding arrangements similar to the winding arrangements of motor P, so that the speed of the regulator-generator R and the speed of the generator G, are, when in normal operation, the same. If desirable, the regulator-generator may be mechanically coupled to the shaft 22. In actual practice, since the dynamo-electric machines 26 and R are of about the same capacity, they will be built as a unit having the same frame and shaft.

As shown in the drawings, the regulator-generator R is provided with a load main or shunt field winding 15 (the prefix "load" indicating that it is connected in the load circuit), a pair of differential field windings 16 and 17 and a load series field winding 14. As indicated by the arrows adjacent these mentioned field windings, differential field windings 16 and 17 and the series field winding 14 are so wound on the pole pieces of the regulator-generator R that they produce magnetomotive forces in the same direction, but opposite to the direction of the magnetomotive force produced by the main or shunt field winding 15.

Assuming the generator G is in operation through suitable operation of a controller or motor starter 27, the starting of the motor M is controlled by push-button switches 28 and 29 which control reversing or directional contactors 30 and 31. The operation of either of the reversing contactors effects the connection of the controller 7 in the system of control to the exciter E. When the controller 7 is thus connected to the exciter E, the current through the Wheatstone bridge will be in one direction when directional contactor 30 is operated and in another direction when the directional contactor 31 is operated.

It is desirable to independently control the flow of current through the main field windings 5 and 6 of the generator G from two sources, one of the sources comprising the exciter E across the armature terminals of which the rheostat 11 and the Wheatstone bridge are connected, and the other source comprising the armature 8 of the regulator-generator. For this purpose, I provide, as already suggested, a Wheatstone bridge circuit comprising the customary four legs or branches, two of which include the resistors $R_1$ and $R_4$ and the other two branches comprise, one of them, the differential field winding 16 of the regulator-generator R and field winding 5 of the main generator G, and the other of them, the field winding 6 of the main generator G, resistor $R_{22}$ and differential field winding 17 of the regulator-generator R.

The armature 8 of the regulator-generator may have its terminals connected to two of the opposite terminals of the Wheatstone bridge either through resistors 9 and 34 or resistor 34 and switch 33. The other two opposite terminals of the Wheatstone bridge may be connected to the exciter E through circuits to be traced hereinafter. The series field winding 14 of the regulator-generator R is connected, as illustrated, in series with an adjustable resistor $R_5$ disposed in the circuit connecting the armatures 3 and 4 of the generator G and motor M, respectively. An adjustable shunt 35 may be provided for adjusting the flow of current through the series field winding 14. The shunt field winding 15 is connected through an adjustable resistor $R_3$ across the armature terminals of the motor M. The resistor $R_6$ is used to reduce the heat loss in the shunt field winding 15 and in consequence reduces to a minimum any change in resistance of the field winding 15 by reason of temperature changes.

Production is an important item on machine tools and the speed of operation and speed of reversal of a reciprocating machine element are thus very important operating characteristics that influence production. Anything in a system of control that will, regardless of the length of the stroke, increase the rate of acceleration of a motor upon starting and increase the rate of retardation of a motor upon stopping is thus a valuable contribution to the art.

With the devices of the prior art and also the systems of control disclosed and claimed in the applications, hereinbefore mentioned, it was not possible to design the field windings of the motor and generator, in a variable voltage control, for a small inductive time constant to thus secure the most rapid reversal.

In the drawings, I illustrate my contribution to the art in its simplest form. I show a resistor 9 in series with the armature of the regulator-generator and show no resistors at all directly in series with the field windings 5 and 16 and 6 and 17. With this arrangement, the generator fields can be designed for a lower resistance and a higher current making them much faster. The legs of the bridge no longer need to be 50 ohms or some other high value but can be very much lower, that is, any lower value and thus will draw more current from the main exciter E. The resistor 9 can be designed to make the regulator-generator self-exciting as the regulator current must pass through this resistor. The arrangement permits not only a much better generator design primarily of the main generator but also of the regulator-generator.

So far as Fig. 4 is concerned, the showing is exactly the same as Fig. 4 of the last hereinbefore recited application, however, the switch 33 is operated in a radically different manner and by radically different means. Relay 200 and the elements that effect and affect its operation are the important contributions made in this case.

The relay contact members 33 in a small measure correspond to the manual switch formerly used. Relay 200 operates these contact members 33. This relay 200 has two coils, main or pick-up coil 201 used to pick up the relay and which coil is connected in series with the reversing limit switches 202 and 203, inside the contacts of reversing contactors 30 and 31, and a hold-in coil 204 connected across the variable voltage generator terminals in series with a slow-down limit switch. The coil 204 does not have sufficient ampere turns to pick-up the relay armature to close the contact members 33, but the coil is chosen of such characteristics as to hold contact members 33 closed, after they have been closed by coil 201, until the voltage of the variable voltage generator G decreases to a value where the commutation will be satisfactory after the resistor 9 is inserted. The variable voltage generator terminal voltage at which it is safe to insert the resistor 9 varies with the ohmic value of the resistor 9 and also with the different sizes of variable voltage generators.

By the use of my arrangement shown in Fig. 4, the resistors $R_1$ and $R_4$ are designed to have a resistance value equal to the sum of the resistance values of the main generator and regulator fields in the respective opposite legs of the bridge and then it is necessary at the factory to select the proper resistance value for only one resistor, namely, resistor 9, to make the regulator self-exciting.

The regulator-generator sends current through the main generator fields in the same direction as the excitation current when the generator is operating near saturation. This is to correct for saturation of the main generator. The resistors $R'_2$ and $R_{22}$ in Fig. 3 must, therefore, be of sufficient capacity to carry both the excitation and regulator current. The resistors $R_1$ and $R_4$ are subjected to the difference between the excitation and regulator voltages and can be of less capacity.

With my new scheme, the two resistors $R'_2$ and $R_{22}$ are not needed and resistors $R_1$ and $R_4$ can be of much lower capacity. My scheme thus provides a circuit arrangement which permits the design of faster main generator fields, in which the adjustment is easier, in which fewer resistors are needed, and in which the resistors used can be of lower capacity.

If the attendant wishes to start the equipment he actuates the motor starter 27 to thus cause the operation of prime mover P and the induction motor 26. Regulator-generator R, the exciter E and the main generator G are thus caused to operate. Operation of the motor starter also establishes an energizing circuit for the coil 38 of the contactor 39, whereupon the contact members 40 are closed to set up circuit connections to be described later.

When the motors P and 26 are up to full speed, the voltage of exciter E will be of full value and in consequence the main motor M may be started. Since the exciter voltage is up to normal, a predetermined direct-current potential is placed across buses 41 and 42.

Energization of buses 41 and 42 provides an energizing circuit for the coil 43 of the relay 44 controlling the field 21 for generator G in a well known manner.

The field winding 2 of motor M is also energized from buses 41 and 42. The field circuit may be traced from bus 41 through conductor 48, the field rheostat comprising the resistor 12 and adjustable lead 10, conductor 49, field winding 2 to bus 42. An additional but low resistance circuit is also established for the field winding 2, which additional circuit may be traced from energized conductor 48 through contact members 84 of starting control relay 85, shunting the field rheostat.

To effect normal operation of motor M, either one of the switches 28 and 29 should be operated. Let switch 28 be the forward control push-button switch. To effect forward operation, that is, an operation in the cut direction, the attendant depresses the switch 28. A circuit is immediately established from bus 41 through stop switch 59, contact members 40, coil 50 of control relay 51, conductor 52, reverse limit switch 53 of the cut limit switch CLS, return starting push-button switch 29, the lower terminals of switch 28, conductor 54, actuating coil 55 of regulator-generator control relay 56 to the bus 42.

Operation of relay 51 opens the contact members 60 and 61 to deenergize coil 43 to thus in a short interval of time open the circuit for the stabilizing field 21.

Operation of relay 56 establishes its own holding circuit through contact members 69 and resistor 70, and also closes switches or contact members 32, 13 and 71.

Closure of contact members 71 establishes a circuit from energized conductor 52 through limit switch 53, switch 29, contact members 71, actuating coil 73 of directional contactor 31, and back contact members 72 of directional contactor 30 to bus 42.

Another circuit may be traced from the closed contact members 69 through coil 78 of the starting relay 85. This coil alone is not of sufficient strength to open contact members 84. The result will naturally be that field 2 is heavily excited and a large starting torque is produced by motor 4.

Since coil 73 is energized, contact members 80, 81 and 82 are closed. A generator field control circuit is thus established from bus 41 through conductor 79, contact members 80, to junction C. From junction C one circuit may be traced through generator field winding 6, regulator field winding 17, junction D, resistor R1, to junction A and another circuit may be traced from junction C through resistor R4, junction B, regulator field 16, generator field winding 5 to junction A. The armature circuit, including armature 8, adjustable resistors 9 and 34 and shunting contact members 33, is connected across junctions B and D. From junction A, the generator field control circuit is through a permanent resistor 48, resistor R7, controller 7, conductors 88, 89 and 90, contact members 81 to bus 42.

Closure of contact members 32 shunts resistor R7 so that the field voltage of exciter E is applied as modified by controller 7 and resistor 48'. The planer will thus run in the cut direction and since the counter-electromotive force of motor M builds up rapidly, coil 92 of relay 85 will be energized. Coils 78 and 92, thus acting together, open the contact members 84 and the motor M thus has its excitation decreased and thus operates at the cutting speed determined by the controller setting for the generator G. Since the generator voltage is at full value, coil 204 is fully energized and since coil 201 is fully energized, contact members 33 are closed and resistor 9 is shunted.

Assuming the planer is running at full cutting speed and the circuits in the arrangement discussed. Near the end of the cut stroke the cut limit switch CLS is operated. Contacts 53 deenergize coil 73 of the cut directional contactor and contacts 53' deenergize coil 201 of relay 200. The contact members 33 may or may not open at the instant coil 201 is deenergized. Assuming it is safe to insert resistor 9 in series with the armature 8 when the terminal voltage of the variable voltage generator G is 200 volts, then the coil 204 will keep the contact members 33 closed for all terminal voltages above 200 volts. When the terminal voltage decreases to 200 volts, the contact members 33 open to insert the resistor 9 in series with the armature 8. The variable voltage generator terminal voltage decreases rapidly to zero and builds up in the reverse direction since contact member 30 will be energized from bus 41 through stop switch 59, contact members 40, coil 50, return limit switch RLS, cut push-button switch 28, contact members 13, coil 103, back contact members 83 to bus 42.

The main motor reverses and the table starts in the return direction. The same dog 93 which operated the cut-limit-switch CLS resets this switch to closed position completing the circuit for coil 201, causing the contacts 33 to close and thus short-circuit the resistor 9.

Near the end of the return stroke, the return-limit-switch, RLS, is operated and one contact, as 102, deenergizes coil 103 of contactor 30 and the other, as 102', deenergizes coil 201. Contact members 33 are, however, again held closed by coil 204 until the voltage of the generator G has decreased below a given value, as 200 volts. After the voltage has decreased, contact members 33 open to again insert resistor 9 in the circuit of armature 8.

The operation as described shows that the resistor 9 is inserted in series with the regulator-generator armature only at the end of the stroke after the limit switch has been operated and then only after the terminal voltage of generator G has decreased to a value that will insure good commutation. The value of voltage used, that is, 200 volts, is for purposes of illustration only.

Tests using my novel scheme of control revealed that the number of short strokes could be increased from 28 to 50 per minute and revealed some saving on the long strokes. The most improvement is on short strokes because the motor is constantly reversing. The greatest advantage on long strokes is the decrease in the overtravel beyond the limit switches thus permitting higher operating speeds when working in blind pockets or against shoulders.

The relay 200 connection may, of course, be in various ways to obtain the same or similar results. I do not wish to be limited to the particular circuit arrangement shown but wish to be limited only by the scope of the claims hereto appended.

I claim as my invention:

1. In a system of control for controlling the excitation of a generator, in combination, a main generator having an armature winding and having a pair of field windings connected in two opposite legs of a balanced Wheatstone bridge, a load connected in series with the generator-armature, a regulator-generator and adjustable resistor connected in series with the armature of the regulator-generator connected across two of the junctions of the Wheatstone bridge, a shunt circuit for the adjustable resistor, switching means responsive to the voltage of the main generator adapted to control the connection of the shunt circuit, said regulator-generator having a pair of field windings energizable respectively by the voltage of the main generator and by the load current and having a pair of field windings one connected in one leg of the bridge in series with one of the main generator field windings and the other connected in the opposite leg of the bridge in series with the other main generator field winding and a pair of bridge balancing resistors connected in the other two opposite legs of the bridge, and a source of variable direct current voltage connected across the other two junctions of the bridge.

2. In a system of control for controlling the excitation of a generator, in combination, a main generator having an armature winding and having a pair of low impedance field windings connected in two opposite legs of the balanced Wheatsone bridge, a load circuit connected in series with said armature winding, a regulator-generator and adjustable resistor connected in series with the armature of the regulator generator connected across two of the junctions of the Wheatsone bridge, a shunt circuit for the adjustable resistor, switching means responsive to the voltage of the main generator adapted to control the connection of the shunt circuit, said regulator-generator having a pair of field windings connected, respectively, in the load circuit of said generator and across the generator terminals and having a pair of field windings one connected in one leg of the bridge in series with one of the low impedance main generator field windings and the other connected in the opposite leg of the bridge in series with the other of the low impedance main generator field windings, and a pair of bridge balancing resistors connected in the other two opposite legs of the bridge.

3. In a system of control for a motor, in combination, a generator having a pair of low impedance field windings, a motor, substantially of the capacity of the generator, directly connected to the generator and having a field winding, an exciter, a controller adapted to alter the excitation of the motor field winding depending on the direction of rotation of the motor and adapted to reverse the connection of the two generator field windings to the exciter, a regulator-generator having an armature winding, and four field windings, an adjustable resistor in series with the armature winding, a shunt circuit for the adjustable resistor, switching means responsive to the voltage of the main generator adapted to control the connection of the shunt circuit, a balanced Wheatstone bridge circuit having two of its junctions connected through the controller to the exciter and having the armature of the regulator-generator and the resistor in series with it connected across the other two or no voltage junctions of the bridge, said Wheatstone bridge including only one regulator-generator field winding and one of the low impedance generator field windings in one leg and only one of the other regulator-generator field windings and the other low impedance field winding in the opposite leg, and including a pair of resistors in the other two opposite legs, the remaining two field windings of the regulator generator being connected, respectively, so as to be energized by the generator voltage and by the armature current of the generator and motor.

4. In a system of control for controlling the voltage of a generator, the sub-combination of a main generator, a Wheatstone bridge including a regulator-generator connected across two of the junctions of the bridge, a source of energizing potential connected across the other two junctions, means responsive to the voltage of the generator for varying the resistance value of the generator circuit of the regulator generator, a low impedance main generator field winding and a field winding for the regulator-generator in one leg of the bridge, a second low impedance main generator field winding and a field winding of the regulator-generator in the opposite leg of the Wheatstone bridge, and a pair of resistors in the two opposite legs of the bridge and two regulator-generator field windings connected respectively to be responsive to the generator voltage and generator load current.

5. In a system of control, in combination, a Wheatstone bridge, a pair of adjustable resistors in each of two of the oppositely disposed branches, and a pair of generators, one of said generators having four field windings and the other of said generators having at least two relatively low impedance field windings, one of the field windings of the first generator and one of the low impedance field windings constituting all of one branch of the Wheatstone bridge, and a second field winding of the first generator and one of the low impedance field windings of the second generator constituting all of the remaining branch of the Wheatstone bridge, the one of said generators having four field windings being connected to two of the junctions of said Wheatstone bridge and including means responsive to the voltage of the generator having the two field windings for varying the resistance value of the armature circuit of the generator having the four field windings, a source of energizing potential connected across the other two junctions, and the other generator being connected to a load and the remaining two field windings of the generator having four field windings being connected to be responsive, respectively, to the voltage and the load of the generator having two field windings.

6. In a system of control, in combination, a Wheatstone bridge, a pair of adjustable resistors in each of two of the oppositely disposed branches, and a pair of generators, one of said generators having four field windings and the other of said generators having at least two low impedance field windings, one of the field windings of the first generator and one of the low impedance field windings constituting all of one branch of the Wheatstone bridge, and a second field winding of the first generator and one of the low impedance field windings of the second generator constituting all of the remaining branch of the Wheatstone bridge, said remaining two field windings of the first generator being connected so as to be energizable respectively in accordance with the potential of the second generator and with the armature current of the second generator, a source of potential connected across two junctions of the Wheatstone bridge, the armature of the generator having the four field windings connected across the other two junctions of the Wheatstone bridge, and means responsive to the voltage of one generator adapted to vary the resistance value of the armature circuit of the other generator.

7. In a variable voltage control system, in combination, a motor, a control source of energy, a generator electrically connected to the motor, a pair of main low impedance field windings for said generator, a controller for connecting the main low impedance field windings to said control source of energy in a plurality of different steps to effect changes in the speed of the motor, and a regulator-generator connected to vary the flow of current through the main low impedance field windings, independently of the current flow therethrough from said control source of energy, to maintain the speed of said motor at predetermined or selected different speeds, each speed corresponding to the step selected by said controller, said regulator-generator having an armature winding, a load series field winding, a load shunt field winding, a pair of differential field windings, said series and shunt field windings being disposed to be differentially related to each other and respectively responsive to the current and voltage supplied to said motor from said generator, said armature windings of said regulator-generator, including in its armature circuit a resistor adapted to be connected in series circuit with said armature winding, means responsive to the voltage of said generator for shunting said resistor, and means for also adjusting the resistance value of said resistor, being connected across one pair of opposite terminals of a normally balanced Wheatstone bridge circuit, the remaining pair of terminals of said bridge circuit being connected through said controller to said control source of energy, one of the arms of said bridge circuit including only one of the pair of said main low impedance field windings, and in series circuit therewith, only one of the said pair of differential field windings of said regulator-generator and the diametrically opposite arm of said bridge circuit including only the other of the said pair of main low impedance field windings and, in series circuit therewith, only the other of said pair of differential field windings of said regulator-generator.

8. In a variable voltage control system, in combination, a motor, a control source of energy, a generator electrically connected to the motor, a pair of main low impedance field windings for said generator, a controller for connecting the main low impedance field windings to said control source of energy in a plurality of different steps to effect changes in the speed of the motor, and a regulator-generator connected to vary the flow of current through the main low impedance field winding independently of the current flow therethrough from said control source of energy, to maintain the speed of said motor at predetermined or selected different speeds, each speed corresponding to the step selected by said controller, said regulator-generator having an armature winding, a load series field winding, a load shunt field winding, a pair of differential field windings, said series and shunt field windings being disposed to be differentially related to each other and respectively responsive to the current and voltage supplied to said motor from said generator, said armature winding of said regulator-generator, including in its armature circuit a resistor adapted to be connected in series circuit with said armature winding, and means responsive to the voltage of said generator for also adjusting the resistance value of said resistor, being connected across one pair of opposite terminals of a normally balanced Wheatstone bridge circuit, the remaining pair of terminals of said bridge circuit being connected through said controller to said control source of energy, one of the arms of said bridge circuit including only one of the pair of said main low impedance field windings and one of the said pair of differential field windings of said regulator-generator connected in series circuit therewith and the diametrically opposite arm of said bridge circuit including the other of the said pair of main field low impedance windings and, in series circuit therewith, the other of said pair of differential field windings of said regulator-generator.

9. In a variable voltage control system, in combination, a motor, a control source of energy, a generator electrically connected to the motor, a pair of main low impedance field windings for said generator, a controller for connecting the main field windings to said control source of energy in a plurality of different steps to effect changes in the speed of the motor, and a regulator-generator connected to vary the flow of current through the main low impedance field windings, independently of the current flow therethrough from said control source of energy, to maintain the speed of said motor at predetermined or selected different speeds, each speed corresponding to the step selected by said controller, said regulator-generator having an armature winding, a load series field winding, a load shunt field winding, a pair of differential field windings, said series and shunt field windings being disposed to be differentially related to each other and respectively responsive to the current and voltage supplied to said motor from said generator, said armature winding of said regulator-generator, including in its armature circuit a resistor adapted to be connected in series circuit with said armature winding, means in series with the armature and responsive to the voltage of said generator for varying the resistance value of said resistor being connected across one pair of opposite terminals of a normally balanced Wheatstone bridge circuit, the remaining pair of terminals of said bridge circuit being connected through said controller to said control source of energy, one of the arms of said bridge circuit including only one of the pair of said main low impedance field windings and in series circuit therewith, one of the said pair of differential field windings of said regulator-generator, and the diametrically opposite arm of said bridge circuit including only the other of the said pair of main low impedance field windings and, in series circuit therewith, the other of said pair of differential field windings of said regulator-generator.

10. In a variable voltage control system, in combination, a motor, a control source of electric energy, a generator electrically connected to the motor, a pair of main low impedance field windings for said generator, a controller for connecting the main low impedance field windings to said control source of energy in a plurality of different steps to effect changes in the speed of the motor, and a regulator-generator connected to vary the flow of current through the main low impedance field windings, independently of the current flow therethrough from said control source of energy, to maintain the speed of said motor at predetermined, or selected, different speeds, each speed corresponding to the step selected by said controller, said regulator-generator having an armature circuit including an armature winding, a load series field winding, a load shunt field winding, a pair of differential field windings, said series and shunt field windings being disposed to be differentially related to each other and respectively responsive to the current and voltage supplied to said motor from said generator, means for varying the resistance of said armature circuit from a given minimum to a given maximum, said armature winding and series adjustable resistor being connected across one pair of opposite terminals of a normally balanced Wheatstone bridge circuit and including means responsive to the voltage of said generator for automatically varying the resistance value of said adjustable resistor, the remaining pair of terminals of said bridge circuit being connected through said controller to said control source of energy, one of the arms of said bridge circuit including only one of the pair of said main low impedance field windings in series circuit therewith, and one of the said pair of differential field windings of said regulator-generator and the diametrically opposite arm of said bridge circuit including only the other of the said pair of main low impedance field windings and, in series circuit therewith, the other of said pair of differential field windings of said regulator-generator.

11. In a system of control, in combination, a Wheatstone bridge, a pair of resistors in each of two of the branches, and a pair of generators, one of said generators having four field windings and the other of said generators having two field windings, one of the field windings of the first generator and one of the field windings of the second generator, connected in series circuit relation, being connected in one of the branches of the bridge and a second field winding of the first generator and the remaining or second, field winding of the second generator, connected in series, being connected in the remaining branch of said Wheatstone bridge, said remaining two field windings of the first generator being connected respectively across the armature terminals of the second generator and in the armature circuit of the second generator to thus be responsive to the voltage and armature current respectively of the second generator, and said generator having the four field windings having its armature connected across two of the junctions of the Wheatstone bridge, and means responsive to the voltage of the generator adapted to vary the resistance value of the armature circuit of the generator having the four field windings.

12. In a speed regulator for an adjustable speed reversing power driven mechanism in which an armature of a generator driven at relatively constant speed is substantially directly connected to an armature of a power motor whose speed is adjusted by changing the voltage of the said generator armature, in combination: a first relatively low impedance field for said generator; a second relatively low impedance field for said generator, a regulator generator having a resistance adjustable armature, means responsive to the voltage of the generator for automatically varying the resistance value of the regulator-generator armature, said regulator-generator having a first, a second, a third and a fourth field; said first regulator field being connected so that current proportional to that flowing between the generator and motor armatures flows in it; said second regulator field being connected so that a current proportional to the voltage across the terminals of said motor flows in it; and a Wheatstone bridge circuit having four junctions, said circuit comprising an adjustable impedance device connected between the first and second junctions; the first low impedance field of said generator and the third field of said regulator in series circuit relation connected directly to the second and third junctions; a second adjustable impedance device connected to the third and fourth junctions and said second low impedance generator field and said fourth regulator field in series circuit relation connected to said fourth and said first junctions; the armature of said regulator generator being connected to a circuit between the first and third junctions and a separate voltage supply of adjustable value being connected to the second and fourth junctions.

13. In a system of control for a motor, in combination, a Wheatstone bridge, a pair of adjustable resistors in each of two of the branches, a pair of generators, one of said generators having four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, field low impedance winding of the second generator, connected in series, being alone connected in the remaining branch of the said Wheatstone bridge, said remaining two field windings of the first generator being connected respectively across the armature terminals of the second generator and in the armature circuit of the second generator to thus be responsive to the voltage and armature current respectively of the second generator and a motor connected across the armature terminals of the second generator, the generator having the four field windings being connected to two of the junctions of the Wheatstone bridge, and a source of voltage connected to the remaining junctions of the Wheatstone bridge, and means responsive to the voltage of one of said generators adapted to vary the resistance value of the armature circuit of the other generator.

14. In a system of control for a motor, in combination, a Wheatstone bridge, a pair of adjustable resistors in each of two of the branches, a pair of generators, one of said generators having four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, field low impedance winding of the second generator, connected in series, being alone connected in the remaining branch of said Wheatstone bridge, said remaining two field windings of the generator having four field windings being connected to be responsive, to the load and voltage, respectively, of the generator having the two field windings, and the armature of the generator having the four field windings being connected to two of the junctions of the Wheatstone bridge, a source of energizing potential connected across the other two junctions and means responsive to the voltage of one of said generators adapted to vary the resistance value of the armature circuit of the other generator.

15. In a system of control for a motor, in combination, a Wheatstone bridge, a pair of adjustable resistors in each of two of the branches, a pair of generators, one of said generators having four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, field low impedance winding of the second generator, connected in series, being alone connected in the remaining branch of said Wheatstone bridge, said remaining two field windings of the first generator being connected respectively across the armature terminals of the second generator and in the armature circuit of the second generator to thus be responsive to the voltage and armature current respectively of the second generator and a motor connected across the armature terminals of the second generator, said first generator being connected across two of the junctions of the said Wheatstone bridge, a source of energizing potential connected across the other two junctions and means responsive to the voltage of one of said generators adapted to vary the resistance value of the armature circuit of the other generator.

16. In a system of control for a motor, in combination, a Wheatstone bridge, a pair of adjustable resistors in each of two of the branches, a pair of generators, one of said generators having four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, field low impedance winding of the second generator, connected in series, being alone connected in the remaining branch of said Wheatstone bridge, said first generator being connected across two of the junctions of the said Wheatstone bridge, a source of energizing potential connected across the other two junctions and the remaining two field windings of the generator having four field windings being connected to be responsive to the voltage and load, respectively, of the generator having the two field windings, and means responsive to the voltage of one of said generators adapted to vary the resistance value of the armature circuit of the other generator.

17. In a system of control, in combination, a Wheatstone bridge, a pair of resistors in each of two of the branches, and a pair of generators, one of said generators having an armature and an adjustable resistor in series therewith and four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, low impedance field winding of the second generator, connected in series, being alone connected in the remaining branch of said Wheatstone bridge, said remaining two field windings of the first generator being connected respectively across the armature terminals of the second generator and in the armature circuit of the second generator to thus be responsive to the voltage and armature current respectively of the second generator, a source of direct-current energy connected across two of the junctions of said Wheatstone bridge, and a motor connected directly to said second generator, said first generator armature and resistor in series therewith being connected to the remaining junctions of said Wheatstone bridge, and means responsive to the voltage of one of said generators adapted to vary the resistance value of the armature circuit of the other generator.

18. In a system of control, in combination, a Wheatstone bridge, a pair of resistors in each of two of the branches, and a pair of generators, one of said generators having an armature and an adjustable resistor in series therewith and four field windings and the other of said generators having at least two relatively low impedance field windings, one of the field windings of the first generator and one of the low impedance field windings of the second generator, connected in series circuit relation, being alone connected in one of the branches of the bridge and a second field winding of the first generator and the remaining, or second, low impedance field winding of the second generator, connected in series, being alone connected in the remaining branch of said Wheatstone bridge, said remaining two field windings of the first generator being connected respectively across the armature terminals of the second generator and in the armature circuit of the second generator to thus be responsive to the voltage and armature current respectively of the second generator, a source of direct-current energy connected across two of the junctions of said Wheatstone bridge, and a motor connected directly to said second generator, said first generator armature and resistor in series therewith being connected to the remaining junctions of said Wheatstone bridge, means for varying the voltage of said source in predetermined steps, and means responsive to the voltage of one of said generators adapted to vary the resistance value of the armature circuit of the other generator.

19. An electrical control system comprising, in combination, a driving motor, a machine tool element driven thereby, means for energizing said driving motor including a generator having a main control field winding, which generator has an armature in loop circuit relationship with the armature of the driving motor, a regulating generator having a control field winding in circuit relationship with said loop circuit so that its current is a function of a variable electrical quantity existing in said loop circuit, and a compensating field winding of said regulating generator in loop circuit relationship with the regulating generator armature and said generator main control field winding.

20. An electrical control system comprising, in combination, a driving motor, a machine tool element driven thereby, means for energizing said driving motor including a generator having a main control field winding, which generator has an armature in loop circuit relationship with the armature of the driving motor, a regulating generator having a control field winding in circuit relationship with said loop circuit so that its current is a function of a variable electrical quantity existing in said loop circuit, and a primary current source serving as a pattern and having a differential effect on said regulating generator control winding so as to differentially control the excitation of said regulating generator.

GEORGE E. KING.